Nov. 17, 1964          A. BEKEY          3,157,809
       ELECTRIC MOTOR HAVING LOW CURIE POINT
             MAGNETIC BRIDGE BETWEEN POLES
Filed Feb. 21, 1961                    2 Sheets-Sheet 1
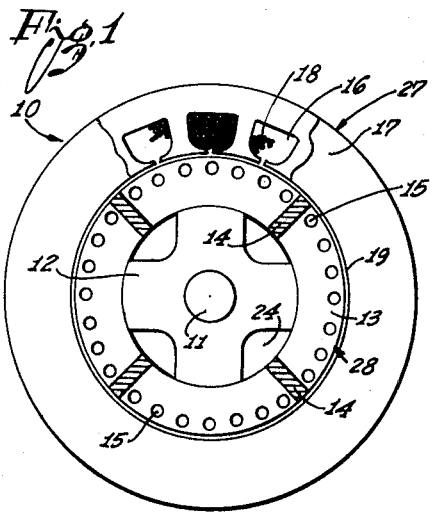
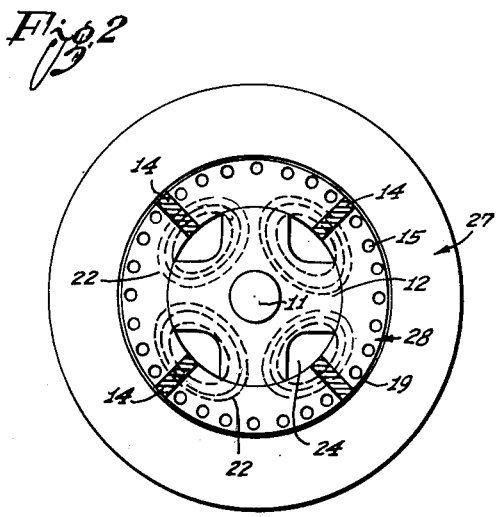
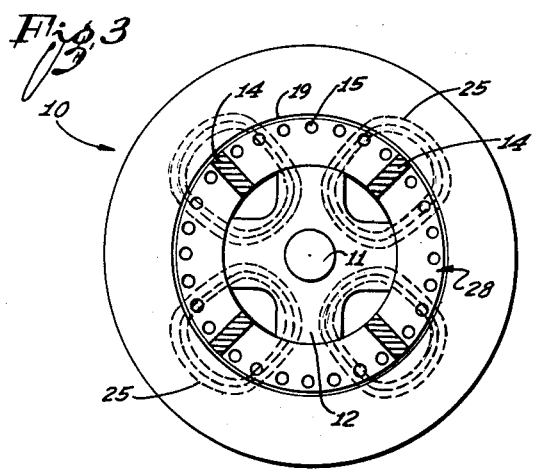
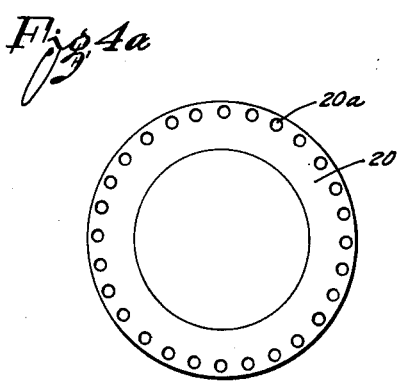
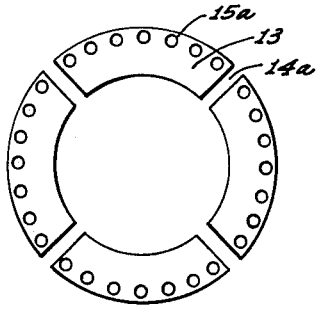
INVENTOR:
Andrew Bekey.
By Smyth, Roston & Pavitt
Attorneys

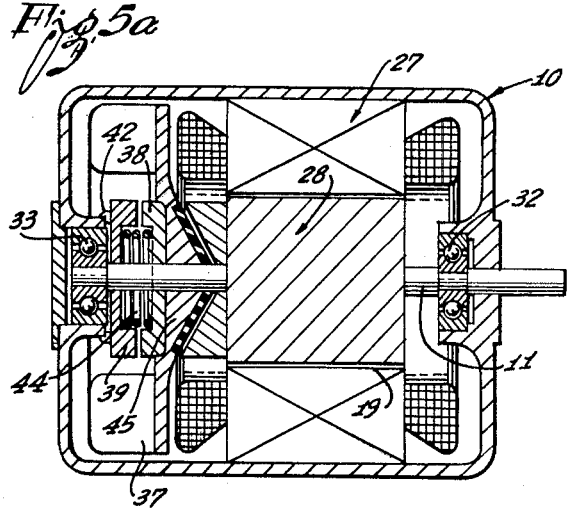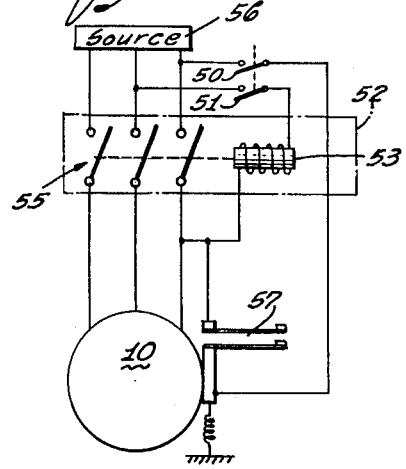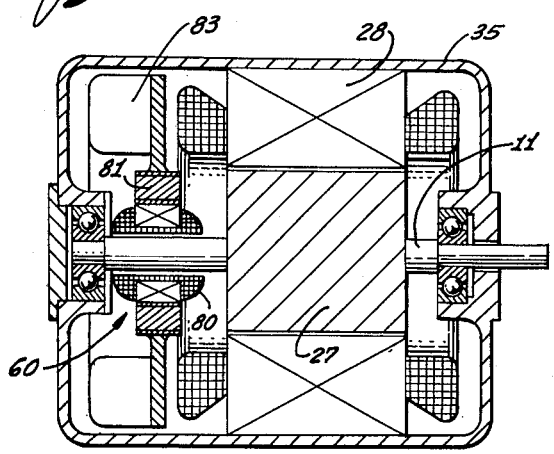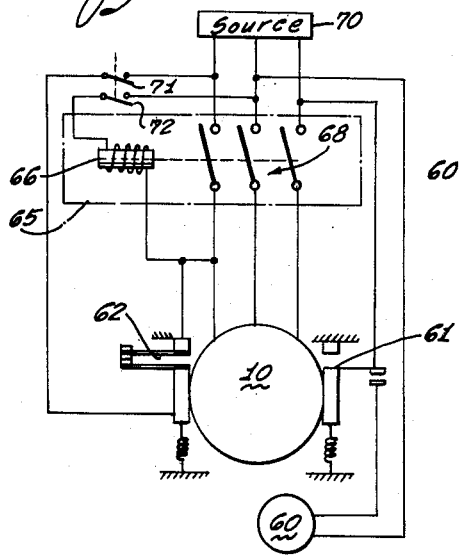

United States Patent Office 3,157,809
Patented Nov. 17, 1964

3,157,809
ELECTRIC MOTOR HAVING LOW CURIE POINT MAGNETIC BRIDGE BETWEEN POLES
Andrew Bekey, Los Angeles, Calif., assignor to Genisco, Incorporated, Los Angeles, Calif., a corporation of California
Filed Feb. 21, 1961, Ser. No. 90,756
13 Claims. (Cl. 310—156)

This invention relates to electric motors and, more particularly, to alternating current synchronous motors.

With the development of high retentivity magnetic materials such as the Alnicos, permanent magnets have been increasingly utilized for the direct current excitation in the rotors of synchronous motors. The use of permanent magnets is desirable because permanent magnet rotors are compact, rugged and economical. These advantages are, however, considerably offset by a number of heretofore unavoidable difficulties. For example, when a permanent magnet is utilized, sizable friction or inertial loads cannot be synchronized. Moreover, with permanent magnet excitation, a sufficient magnetomotive force cannot be developed to increase the power factor of the motor to unity or a greater value. Further, the permanent magnets tend to be demagnetized by the stator flux during the acceleration of the rotor to its synchronous operating speed.

In a specific illustrative embodiment of this invention, a permanent magnet excited synchronous motor is provided which can synchronize any load within the limits of its accelerating torque regardless of the inertia of the load. The synchronous motor, moreover, can operate at a unity or leading power factor.

A feature of the invention relates to the utilization of the property of magnetic materials known as the Curie effect. The Curie effect refers to the change in magnetic properties of the material when its temperature is changed through a particular temperature unique to the material. This particular temperature, which is referred to as the Curie point of the material, is defined as the temperature at which the properties of the material change from ferromagnetic to paramagnetic as the temperature is increased. The Curie point or temperature is different for different materials. For example, hot rolled silicone steel has a Curie point of 730 degrees centigrade; the ferrite (Mn—Zn) has a transition or Curie point at 130 degrees centigrade; and the compound MnP has a Curie point at 20 degrees centigrade. The Curie effect wherein, for temperatures below the Curie point, a material is ferromagnetic and for temperatures above the Curie point, the material is paramagnetic or non-magnetic, is a reversible process. As the temperature of a material is increased and decreased through the Curie point, the magnetic characteristics of the material, accordingly, change back and forth.

Further features of this invention relate to the provision of a bar of material having a low Curie point in an interpolar slot in the rotor of the synchronous motor. The low Curie point material completely separates the segments of magnetic material of the rotor which form a ring. A tight fitting permanent magnet is enclosed centrally in the rotor ring and a conventional cage winding is placed in the segments of magnetic material forming the ring which surrounds the permanent magnet. The dimensions of the interpolar slot are substantially greater than the air gap between the stator and the rotor so that when the interpolar bars are paramagnetic, they present a reluctance considerably greater than that of the air gap.

When the motor is started up, the low Curie point material being cold, is ferromagnetic and forms an effective magnetic shunt for the flux from the permanent magnet in the rotor. The motor, accordingly, accelerates as an induction motor and when it reaches near synchronous speed, the rotating stator magnetomotive force combines with the magnetomotive force of the magnet in the rotor so that the magnet is locked in with the stator rotating field. The temperature characteristics of the motor are designed so that it passes through the Curie point of the bar material in the interpolar slots just after the motor reaches synchronous speed. The magnetic shunts through the interpolar slots are, accordingly, removed or become high reluctance paths as the material becomes paramagnetic. The magnetomotive force from the magnet, accordingly, combines with that of the stator and the motor behaves like a D.C. excited synchronous motor in which the field current is raised to full excitation.

Still further features of this invention relate to the provision of means for controlling the temperature of the motor. The controlling means includes a fan having a control member which may be made of the same low Curie point material as is utilized in the rotor. The fan is operative for temperatures exceeding the Curie point.

Other features of this invention relate to the provision of means for inhibiting a restarting operation of the motor as long as its temperature is above the Curie point. This prevents the provision of the stator flux into the magnet during acceleration when the magnetic shunts through the interpolar slots are not present. A relay or thermal switch which is effective at the Curie point temperature, and which may include the same low Curie point material as is utilized in the rotor, is utilized for controlling the restarting operation.

Further advantages and features of this invention will become apparent upon consideration of the following description when read in conjunction with the drawing wherein:

FIGURE 1 is a sectional view through the synchronous motor of this invention;

FIGURE 2 is a partial sectional view, with the section being through the rotor of the synchronous motor of this invention, and illustrating the lines of magnetomotive force originating in the permanent magnet for temperatures of the rotor less than the Curie point of the bar material in the interpolar slots;

FIGURE 3 is a partial sectional view, with the section being through the rotor of the synchronous motor of this invention, and illustrating the lines of magnetomotive force originating in the permanent magnet for temperatures of the rotor greater than the Curie point of the bar material in the interpolar slots;

FIGURE 4a is a side view of a non-magnetic rotor stamping utilized in the synchronous motor of this invention;

FIGURE 4b is a side view of a magnetic rotor stamping utilized in the synchronous motor of this invention;

FIGURE 5a is a sectional view illustrating a synchronous motor and fan utilized in an embodiment of this invention;

FIGURE 5b is a circuit representation of an embodiment of a system utilizing the synchronous motor of this invention and including means for inhibiting a restart operation until the motor has cooled below the Curie point of the bar material;

FIGURE 6a is a sectional view illustrating the synchronous motor and fan utilized in another embodiment of this invention; and FIGURE 6b is a circuit representation of another embodiment of a system utilizing the synchronous motor of this invention and including means for inhibiting a restart operation for the motor until it cools below the Curie point of the bar material.

Referring to FIGURE 1, the permanent magnet excited synchronous motor 10 is depicted. The synchronous motor 10 has a stator 27 which is of a conventional type and which includes stator laminations 17 made of a magnetic material. The laminations 17 define a plurality of stator slots 16 for supporting the stator windings 18. The power provided to the stator windings 18 may be three phase power and a rotating magnetic field is developed responsive to the energization of the stator windings 18.

Supported concentrically in the stator 27 is a rotor 28 which is supported on a shaft 11. The rotor 28 includes a centrally located permanent magnet 12 made of a suitable material such as of Alnico, and a composite ring surrounding the permanent magnet 12 and including a plurality of segment laminations 13, shown also in FIGURE 4b, and a number of laminations 20 shown in FIGURE 4a. The laminations or stampings 13 are made of a magnetic material and the laminations 20 are made of a non-magnetic material. The laminations 13 define a number of interpolar slots 14a shown in FIGURE 4b, whereas the laminations or stampings 20 do not define such interpolar slots. The non-magnetic laminations 20 form a sandwich about the segments 13 and are utilized to provide mechanical support to the rotor ring. The interpolar slots 14a completely separate the segments 13 of magnetic material. The magnetic material of the segments 13 may be Silicone steel or it may be a hysteresis material. If a hysteresis material is utilized, a stronger synchronization torque is available. The stampings 20, which sandwich the segments 13, may be made of a nonmagnetic material such as stainless steel. Similar stampings may be provided at regular spacings along the length of the rotor to increase the strength of the rotor 28. When such intermediate stampings 20 are provided, then the bars 14, which are hereinafter described, do not extend uninterruptedly along the length of the rotor but are interrupted at the intermediate stampings 20.

The rotor 28 also includes a number of inserts or bars 14, one in each of the slots 14a between the segments 13. The bars 14 are made of a material of low or otherwise specified Curie point. The Curie point of a material is defined as the temperature at which its properties change from ferromagnetic or high permeability to paramagnetic or low permeability as the temperature is increasing. The Curie point for the Silicon steel is approximately 730 degrees centigrade, whereas the Curie point for a ferrite (Mn—Zn) is at 130 degrees centigrade. The bars 14 may be made of a ferrite material and, accordingly, have a Curie point substantially lower than that of the laminations 13 forming the rotor ring.

The temperature characteristics of the motor 10 are such that the temperature remains less than the Curie point of the material of the bars 14 after the motor is started up and until after the motor has reached its synchronous speed. In this manner, when the motor 10 is started and the rotor 28 is accelerated, the bars 14 function as high permeability magnetic shunts for the flux generated in the permanent magnet 12. FIGURE 2 illustrates the lines 22 of magnetomotive force developed in the permanent magnet 12 and passing through the bars 14 which, as indicated above, are at their ferromagnetic or high permeability conditions at this time.

The segments 13 define a number of openings 15a shown in FIGURE 4a, and the segments 20 define openings 20a which enclose squirrel cage bars 15. A pair of end rings, not shown, at opposite sides of the rotor 28 complete the path for the current through the bars 15. The bars 15 and the squirrel cage end rings, not shown, may be made of an electrically conductive material such as copper. When the stator windings 18 are first energized, considerable current is provided through the bars 15 for inducing an accelerating torque. As the motor attains synchronous speed, the current in the bars 15 reduces to zero. During the acceleration of the rotor 28, most of the flux generated by the stator 27 and most of the flux generated in the permanent magnet 12 are provided through the magnetic shunts consisting of the bars 14 of low Curie point material. When the motor is started and the bars 14 are in their ferromagnetic conditions, the motor 10 is accelerated as an induction motor. When it reaches near synchronous speed, the stator magnetomotive force combines with the magnetomotive force from the magnet 12 in the rotor 28 and the magnet 12 locks into the stator rotating field.

When the temperature in the rotor 28 exceeds the Curie point of the material of the bars 14, the bars 14 become paramagnetic and constitute a barrier of extremely low permeability or high reluctance. In other words, the effective magnetic shunts are removed. The reluctance through the interpolar slots 14a may be approximately 10 times as large as through the air gap 19 because the dimension of the slots 14a and of the bars 14 may be equal in a circumferential direction to ten times the width of the air gap 19.

The air gap 19 between the stator 27 and the rotor 28 may be somewhat smaller than in a D.C. excited synchronous motor because of the smaller magnetomotive force provided by a permanent magnet. Most of the magnetomotive force from the magnet 12 passes, as shown by the lines 25 in FIGURE 3, through the air gap 19 and combines with the stator flux so that the lines from pole to pole pass through the stator 27.

When the motor passes through the Curie point after it reaches synchronization, it behaves like a D.C. excited synchronous motor in which the field current is raised to full excitation.

It is desirable when the motor 10 is started up to avoid the penetration of stator flux into the permanent magnet 12 in order to avoid any demagnetization of the magnet 12. After the rotor 28 has attained synchronous speed, the stator and magnet flux aid each other so that there is no de-synchronization effect. In order to avoid demagnetization, the bars 14 should be at a temperature less than that of the Curie point so as to function as magnetic shunts when the motor is not being operated at its synchronous speed. FIGURE 5b illustrates a circuit arrangement having a starting relay or magnetic switch 52 which prevents restarting the motor 10 until after it has cooled below the Curie point of the material of the bars 14. In FIGURE 5b, three phase power is provided from a source 56 to a pair of ganged switches 50 and 51 which may be push-button controlled switches. When the switches 50 and 51 are closed, power is provided through a thermal switch 57 across the winding 53 of the relay 52. The thermal switch 57 may be designed to operate or open the current path at the Curie point of the bar material. When the winding 53 is energized, it closes the three armatures 55 to supply the three-phase power from the source 56 to the motor 10.

When the switches 50 and 51 are thereafter opened to stop the motor 10, the relay 52 releases and opens the current path from the source 56 to the motor 10. The thermal switch 57, however, remains open until after the temperature of the motor 10 cools below the Curie point. The arrangement, accordingly, prevents starting up of the motor 10 when the magnetic shunts through the bars 14 are ineffective.

The motor 10 may be included as part of a heating and cooling system shown in FIGURE 5a. Referring to FIGURE 5a, the motor 10 is enclosed in a housing 35 which also encloses a fan 37. The various components in FIGURE 5a have been given similar reference designations as the corresponding components in FIGURES 1 through 4. The fan 37 is rotatably supported by a friction clutch 45 on the shaft 11 of the rotor 28. For temperatures below the Curie point of the bars 14, the clutch 45 is disengaged so that the fan 37 is not rotated. The fan 37 and the clutch 45 support a permanent magnet 38 relative to a thermal actuator 39. The actuator 39 is attached as by welds 42 to the housing 35. The shaft 11 is concentric with the magnet 38 and the actuator 39 and is supported by a pair of bearings 32 and 33 at opposite ends of the housing 35. The actuator 39 is made of a material having the same Curie point as the bars 14 in the rotor 28. Accordingly, for temperatures below the Curie point, the magnet 38 is attracted to the actuator 39 to hold the friction clutch 45 disengaged. A spring 44 enclosed between the actuator 39 and the magnet 38 is compressed due to the attraction of the magnet 38 against the actuator 39.

When, however, the temperature exceeds the Curie point, the material of the actuator 39 becomes paramagnetic and the spring 44 becomes effective to engage the friction clutch 25. With the friction clutch 45 regulated, the fan 37 is rotated to cool the motor 10. The thermal design of the motor 10 in the housing 35 is such that it will reach a temperature higher than the Curie point if it is not cooled by the fan 37. The fan 37 cools the rotor 28 until the temperature decreases to the Curie point of the bars 14. At this point, the permanent magnet 38 is again attracted to the actuator 39 to disengage the friction clutch 45. The fan 37 is, accordingly, operated on and off maintaining the temperature somewhat above the Curie point of the magnetic shunts or bars 14 and the full strength of the permanent magnet 12 in the rotor 28 is available to supply the excitation.

In FIGURE 6b another embodiment is depicted utilizing two thermal switches or relays 61 and 62. The relay or switch 61 is utilized for a fan motor 60 and the relay 62 is utilized for the synchronous motor 10. The synchronous motor 10 cannot be restarted until after the motor cools below the Curie point. The fan motor 60, however, continues to cool the motor 10 after the motor 10 is disconnected from the power source 70 until it is cooled below the Curie point. The manual or push-button switches 71 and 72 are closed to start up the motor 10 by operating the magnetic starter or relay 65. The winding 66 is energized over a path through the switch 62 for closing the three armatures 68 between the power source 70 and the motor 10. When the switches 71 and 72 are opened after the motor 10 has been running at synchronous speed, the relay 65 is de-energized to stop the motor 10 but the fan motor 60 remains energized. The switch 61 is closed for temperatures exceeding the Curie point and, accordingly, the motor 60 remains energized even though the motor 10 is stopped. When the motor 10 cools to the Curie point, the switch 61 opens to stop the fan motor 60.

FIGURE 6a illustrates the physical arrangement of the components described above in reference to FIGURE 6b. The fan motor 60 is referred to as an inside-outside motor because the windings 80 are internally mounted and the rotor 81 is mounted about the stator windings 80. The fan blades 83 are mounted on the rotor 81. The rotor 81 may be made of the same magnetic material as the bars 14. A highly compact arrangement is provided utilizing the inside-out fan motor 60. The various other components shown in FIGURE 6a have been given reference designations similar to that for corresponding components in the other figures.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

I claim:

1. A synchronous motor, including, a stator, and a rotor concentric with said stator for running at a synchronous speed and having a permanent magnet centrally located in said rotor, a cylindrical member concentric with said magnet and in contact with said magnet, said cylindrical member being made of a magnetic material having a high permeability, and defining a plurality of radial slots, and a bar positioned in each of the radial slots of said cylindrical member, said bar being made of a material having a Curie point such that the temperature of the rotor reaches said Curie point simultaneously as the rotor speed approaches synchronous speed during starting, said bars when below said Curie point being effective to provide a low reluctance to the slots to thereby form a continuous cylindrical path having a low reluctance, said bars when above said Curie point being effective to provide a high reluctance in the slots to thereby divide the cylindrical member into a plurality of magnetic segments and cause the rotor to run at the synchronous speed.

2. In an alternating current apparatus, the combination of a central member rotatable about a central rotor axis at an operating speed and having characteristics for developing magnetic flux, a pair of radially aligned oppositely positioned shunt members positioned in said central member for controlling the path of the magnetic flux developed by said central member, said shunt members being made of magnetic material having a low Curie point such that the temperature of the central member reaches said Curie point simultaneously as the central member reaches said operating speed, said shunt members when above the Curie point being effective to divide the central member into a plurality of magnetically different segments to cause the rotor to run at the operating speed and when below the Curie point being effective to unite the central member into a single magnetic circuit to permit said rotor to run at less than the operating speed.

3. A rotor for a synchronous induction motor, including, rotor having a permanent magnet, and a cylindrical sleeve for rotating at a synchronous speed, said sleeve including a plurality of laminations surrounding said magnet and defining a number of spaced slots, said sleeve being made of a magnetic material, and a control member in each of said slots being made of a magnetic material having a Curie point lower than the Curie point of the magnetic material of said sleeve, said control members acting as magnetic short circuits to said permanent magnet when the rotor temperature is below said Curie temperature to thereby confine the magnetic flux field from the permanent magnet to the sleeve and acting as essentially magnetic open circuits otherwise to permit the magnetic flux field from the permanent magnet to extend beyond the sleeve and cause the rotor running at synchronous speed.

4. A rotor in accordance with claim 3, including in addition, squirrel cage bars embedded in said sleeve, and short-circuiting end rings for said bars.

5. A rotor in accordance with claim 3, wherein each of the spaced slots is radially aligned and extends across said sleeve to separate said sleeve into separate segments.

6. A rotor for a synchronous induction motor including, a permanent magnet, a cylindrical sleeve for rotating at a synchronous speed and including laminations surrounding said magnet and defining a number of spaced slots, said sleeve being made of a magnetic material, a control member in each of said slots being made of a magnetic material having a Curie point lower than the Curie point of the magnetic material of said sleeve, a rotor shaft centrally located in said permanent magnet, said control members acting as a magnetic short circuit to the permanent magnet when the rotor temperature is below said Curie temperature to confine the magnetic flux field from the permanent magnet to the sleeve and allow the sleeve to rotate at less than the synchronous speed and acting as essentially a magnetic open circuit otherwise to permit the magnetic flux field from the permanent magnet to extend beyond the sleeve and cause the rotor to rotate at said synchronous speed, a fan rotatable on said shaft and including clutch means for engaging said shaft and rotating therewith to cool the rotor, said fan including an actuator member made of the same magnetic material as said control member for operating said clutch means for temperatures over the Curie point of said same magnetic material.

7. In combination, a rotor in accordance with claim 6, a stator encircling said rotor and having windings, a source of power connectable to said windings, and means connected to said source and to said windings for inhibiting the reconnection of said source to said windings as long as the temperature of the rotor exceeds the Curie point of said same magnetic material.

8. A synchronous motor, including, a stator, and a rotor concentric with said stator for rotating at a synchronous speed, a permanent magnet centrally located in said rotor, a cylindrical member concentric with said magnet and in contact with said magnet, said cylindrical member being made of a magnetic material having a high permeability, and defining a plurality of radial slots, and a bar made of a low Curie point material positioned in each of the radial slots of said cylindrical member, said bars acting as a magnetic short circuit to said permanent magnet when the rotor temperature is below said Curie temperature to thereby confine the magnetic flux field to the rotor to allow the rotor to rotate at less than the synchronous speed and acting as essentially a magnetic open circuit otherwise to allow the magnetic flux field to extend outside of the rotor to rotate at the synchronous speed, a source of A.C. power connectible to said stator, connecting means coupled to said source and to said stator for connecting said source to said stator, and means coupled to said connecting means for inhibiting the operation of said connecting means as long as the temperature of said rotor exceeds said low Curie point.

9. A synchronous motor in accordance with claim 1, including in addition, a fan for cooling said rotor, and temperature responsive means for operating said fan for temperatures exceeding said low Curie point.

10. A synchronous motor including a stator having at least one winding, a rotor having a permanent magnet, a cylindrical sleeve of laminations surrounding said magnet and defining a number of spaced slots, said sleeve being made of a magnetic material, and a control member in each of said slots being made of a magnetic material having a Curie point lower than the Curie point of the magnetic material of said sleeve, and a source of power connected to said winding for energizing said winding to drive said rotor and to generate heat sufficient to raise the temperature of said rotor over the Curie point of the magnetic material of said sleeve, said control members acting as a magnetic short circuit to said permanent magnet when the rotor temperature is below said Curie temperature and acting as essentially a magnetic open circuit otherwise, said short circuit being effective to confine the magnetic flux field to the rotor and to allow the rotor to rotate at less than synchronous speed, said open circuit being effective to cause the magnetic flux field to extend outside of the rotor and rotate the rotor at synchronous speed.

11. A synchronous motor having a stator, a rotor for rotating at a synchronous speed, at least one control member in said rotor and made of magnetic material having a particular low Curie point, and a source of power connected to said stator for energizing said stator to accelerate said rotor to synchronous speed and to increase the temperature of said rotor over said particular low Curie point after said rotor is rotating at the synchronous speed of the motor, said particular Curie point being below the temperature that said rotor reaches when rotating at synchronous speed, said control member being effective when below the Curie point to unite the rotor into a closed magnetic circuit to allow the rotor to rotate at less than the synchronous speed and when above the Curie point to divide the rotor into a plurality of magnetic segments to drive the rotor at the synchronous speed.

12. A synchronous motor having a stator, a rotor of magnetic material for rotating at synchronous speed, at least one control member made of magnetic material in said rotor and having a particular low Curie point, and a source of power connected to said stator for energizing said stator to accelerate said rotor to synchronous speed and to increase the temperature of said rotor over said particular low Curie point after said rotor is rotating at the synchronous speed of the motor, said control member being positioned in said rotor to circumferentially divide the rotor into a plurality of separate segments, said control member being made of a material having a Curie point such that the temperature of the rotor reaches said Curie point simultaneously as the rotor speed approaches synchronous speed during starting, said control member when below the Curie point being effective to unite the rotor into an unbroken magnetic path to allow the rotor to rotate at less than synchronous speed and when above the Curie point being effective to divide the rotor into a plurality of separate magnetic segments to drive the rotor at synchronous speed, a fan for cooling said rotor, and temperature responsive means for operating said fan for temperatures exceeding said low Curie point.

13. A synchronous motor in accordance with claim 12, wherein said temperature responsive means includes an actuating member made of a magnetic material having said low Curie point.

References Cited in the file of this patent

UNITED STATES PATENTS

| | | |
|---|---|---|
| 2,245,268 | Gross | June 10, 1941 |
| 2,719,931 | Kober | Oct. 3, 1955 |

OTHER REFERENCES

Metals Handbook, published by American Society for Metals, vol. I, 8th Ed.